United States Patent [19]

Lehtonen

[11] Patent Number: 5,006,006

[45] Date of Patent: Apr. 9, 1991

[54] CONNECTOR FOR CONNECTING WOODEN BEAMS TO ONE ANOTHER

[75] Inventor: Markku S. Lehtonen, Routio, Finland

[73] Assignee: Metsa-Serla Oy, Kirkniemi, Finland

[21] Appl. No.: 404,041

[22] Filed: Sep. 11, 1989

Related U.S. Application Data

[63] Continuation of Ser. No. 14,191, Feb. 12, 1987, abandoned.

[30] Foreign Application Priority Data

Feb. 13, 1986 [FI] Finland ............................. 860665

[51] Int. Cl.⁵ ............................................. F16B 15/00
[52] U.S. Cl. ................................. 403/283; 403/272; 403/405.1; 411/458; 411/466; 52/712; 52/DIG. 6
[58] Field of Search ............... 403/232.1, 382, 174, 403/178, 219, 283, 272, 396, 405.1, 97, 384, 389; 52/712, DIG. 6, 693, 715; 411/457–462, 466–468

[56] References Cited

U.S. PATENT DOCUMENTS

| | | | |
|---|---|---|---|
| 1,392,070 | 9/1921 | Maiers | 403/283 |
| 1,402,304 | 1/1922 | Lord | 403/283 |
| 2,400,266 | 5/1946 | Soffer | 403/283 |
| 2,685,469 | 8/1954 | Butler et al. | 403/97 |
| 3,416,283 | 12/1968 | Sanford | 411/467 X |
| 3,454,292 | 7/1969 | Sanford | 403/283 |
| 3,498,170 | 3/1970 | Sanford | 411/468 |
| 3,790,120 | 2/1974 | Wise | 403/272 X |
| 3,841,195 | 10/1974 | Jureit | 411/466 X |
| 3,861,107 | 1/1975 | Papayoti | 403/178 X |
| 4,068,964 | 1/1978 | Stoker | 403/272 |
| 4,299,511 | 11/1981 | Demers | 403/405.1 |
| 4,486,115 | 12/1984 | Rionda et al. | 411/466 X |
| 4,488,389 | 12/1984 | Farmont | 411/466 X |
| 4,639,176 | 1/1987 | Smith et al. | 403/405.1 |

FOREIGN PATENT DOCUMENTS

| | | | |
|---|---|---|---|
| 2606666 | 8/1977 | Fed. Rep. of Germany . | |
| 2940809 | 4/1981 | Fed. Rep. of Germany . | |
| 1336333 | 7/1963 | France | 403/97 |
| 216619 | 12/1941 | Switzerland | 411/459 |
| 391257 | 4/1933 | United Kingdom . | |

*Primary Examiner*—Peter M. Cuomo
*Attorney, Agent, or Firm*—Cushman, Darby & Cushman

[57] ABSTRACT

A connector for connecting wooden beams to one another, in which the capacities of a conventional toothed plate to transfer tensile and compressive forces have been improved by securing one or several toothed plates (3, 4, 5) to a mutual frame plate (2).

3 Claims, 4 Drawing Sheets

CONNECTOR FOR CONNECTING WOODEN BEAMS TO ONE ANOTHER

This is a continuation of application Ser. No. 07/014,191, filed Feb. 12, 1987, abandoned.

FIELD OF THE INVENTION

The invention relates to a connector for interconnecting wooden beams, which are advantageously of so-called laminated veneer lumber.

BACKGROUND OF THE INVENTION

It is previously known to use various types of toothed plates for interconnecting wooden beams. Such a plate is known from, for example, U.S. Pat. No. 2 606 666. The "teeth", i.e. the protrusions serving as nails in the toothed plate, are in such devices produced by punching out and bending arrow-shaped protrusions in the plate. This procedure limits the thickness of the plate used. With steel plates over about 2 mm thick it is very difficult to produce in a simple way the punches and bendings referred to. The disadvantage of this toothed plate is thus its poor capacity to transfer high tensile, compressive and shear forces. In the device according to U.S. Pat. No. 3,498,170, the toothed plate produced thus by punching is reinforced by placing on the toothside of the plate a separate perforated plate which supports the teeth. The reinforcing effect of this separate additional plate does not, however, correspond to, for example, the increased weight, and the structure requires a very high manufacturing precision in order to work at all.

In order to solve the above-mentioned problem, a new connector is disclosed in, for example, Finnish Patent Application No. 833 655, the connector having a very thick steel plate to which a large number of teeth have been secured by, for example, welding. By this solution it is possible to produce a joint capable of transferring very high forces. This solution has, however, a disadvantage in its relatively expensive manufacturing method. Also the connector is very heavy and the material costs are high.

SUMMARY OF THE INVENTION

The object of the invention is to produce a connector which is capable of transferring higher tensile and compressive force loads than are conventional toothed plates, but is lighter in weight and less expensive than is the last-mentioned toothed plate provided with welded teeth. According to the invention, this is achieved by making up the connector of a frame plate and of at least one toothed plate secured to it.

Such a connector according to the invention can be used in, for example, truss structures. The frame plate may be, for example, 3-8 mm thick, and the toothed plates may advantageously be 1-2 mm thick.

The frame plate is preferably designed to have the shape of the joint area, in which case it is fitted on the outer surfaces of the wooden beams or, if toothed plates are fitted on both sides of the frame plate, it is embedded in the longitudinal direction inside a double-beam arrangement made up of two beams running in parallel. By the latter method a neat outer surface and a fire-safe system are obtained, as well as a structure which is advantageous in terms of the transfer of forces.

The toothed plates are secured to the frame plates preferably by spot welding, soldering or glueing. These securing methods are here together called 'surface joints'. According to the invention it is also advantageous to secure the toothed plate to the frame plate in such a way that the punched-out protrusions are situated at a certain angle in relation to the grain of the wooden beams, depending on the shape of the punching. If the protrusions in this case are oriented so that they press into the beam in parallel to the grain, they break the wood minimally. This provides a firmer attachment.

BRIEF DESCRIPTION OF THE DRAWINGS

The invention is described below in greater detail with reference to the accompanying figures, in which.

DESCRIPTION OF PREFERRED EMBODIMENTS

Figure 1:
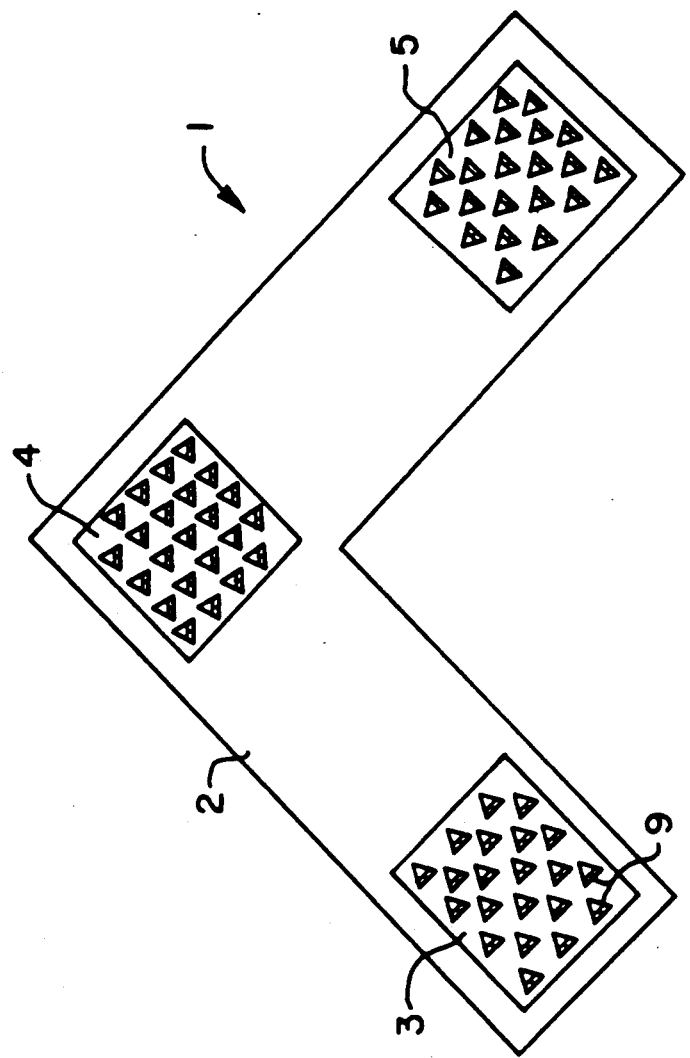
FIG. 1 depicts a connector according to the invention.

FIG. 1 shows a connector 1 which is made up of a frame plate 2 and of toothed plates 3, 4 and 5 secured to it by spot welding. The figure also shows protrusions 9, which have been produced in the toothed plate 3 by punching before its being secured to the frame plate 2.

Figure 2:
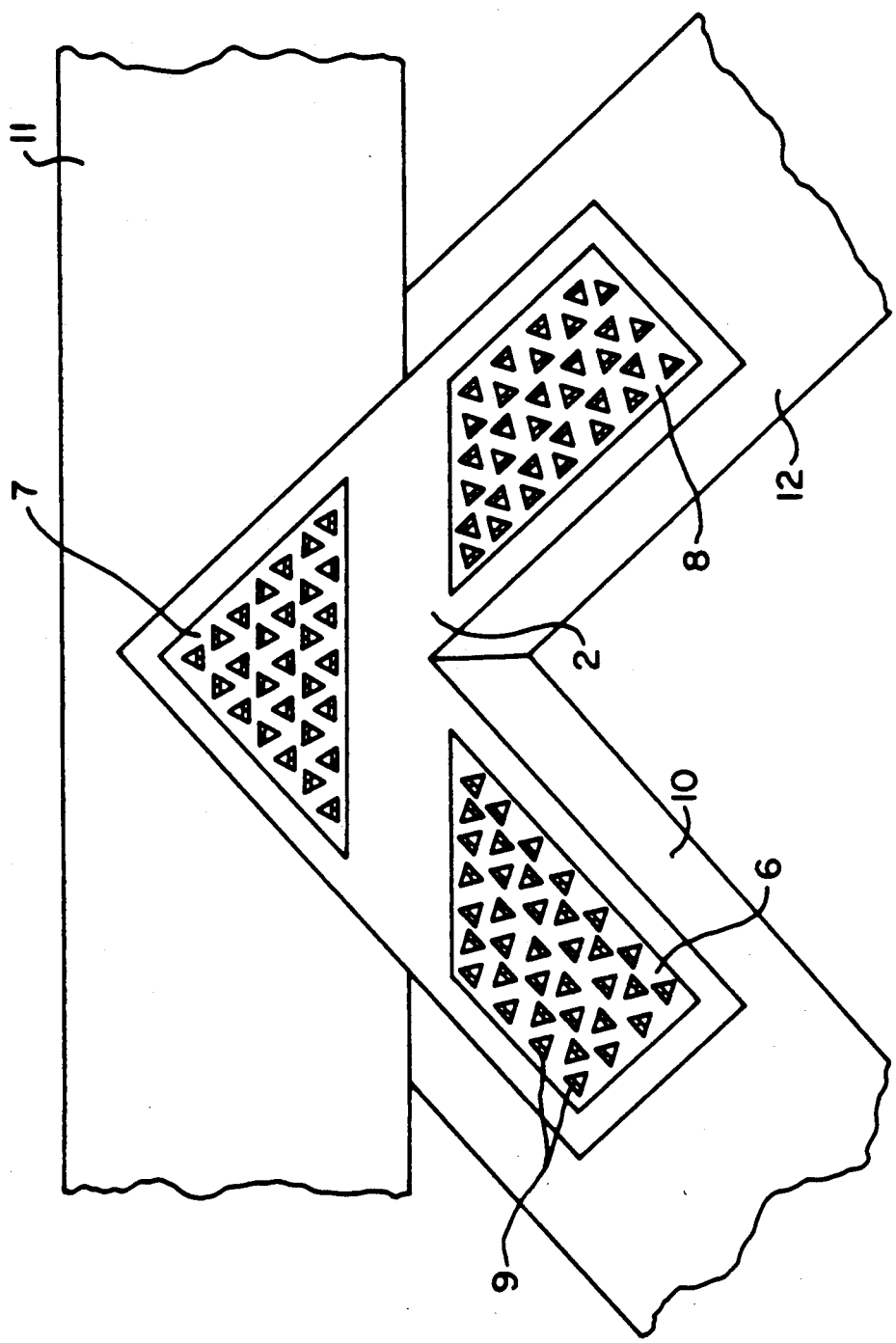
FIG. 2 depicts a connector according to the invention, fitted in an opened area of the joint of double wooden beams.

FIG. 2 shows a connector of a corresponding type, fitted in a joint. In this, wooden beams 10, 11 and 12 have been interconnected by means of a connector 2. This connector differs from the connector according to FIG. 1 only with regard to the shape of the toothed plates.

Figure 3:
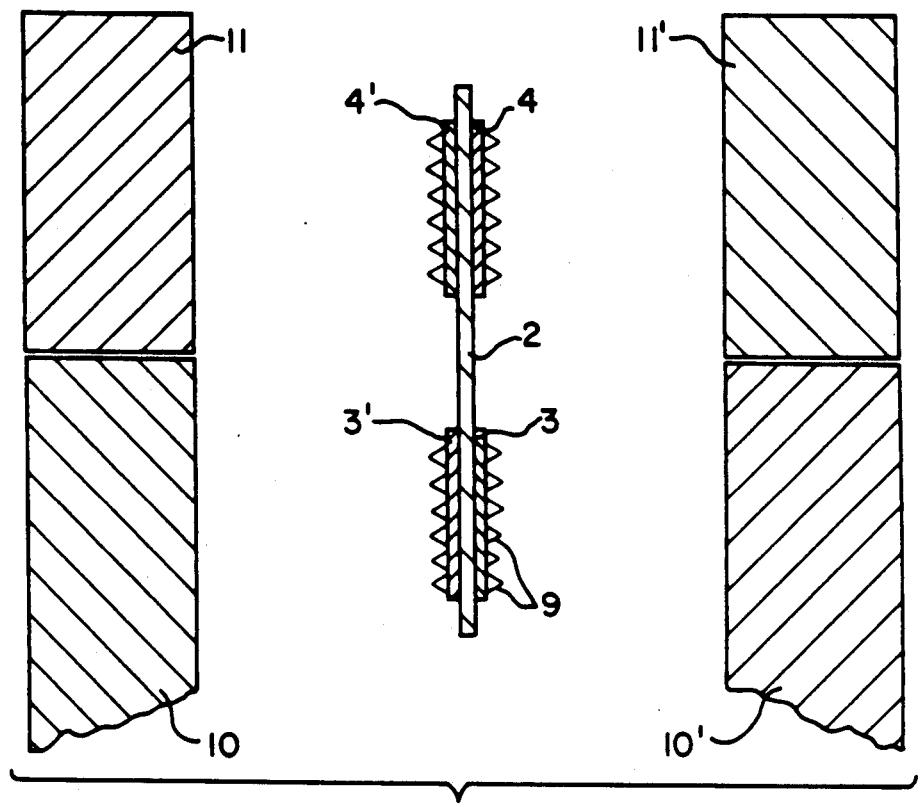
FIG. 3 depicts a two-sided connector according to the invention, as seen from the end of the connector.

FIG. 3 shows, opened, a joint in which the connector is situated inside double wooden beams 11, 11'; 10, 10'. In this case, toothed plates 3, 3'; 4, 4' are fitted on both sides of the frame plate 2.

Figure 4:
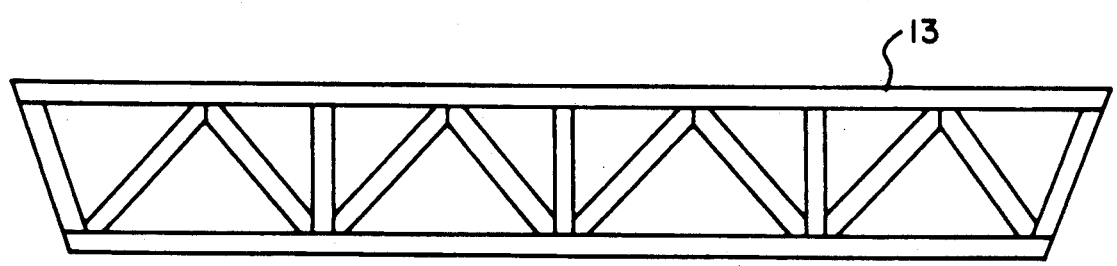
FIG. 4 depicts a top chord in which a connector according to the invention is used.

FIG. 4 shows a top chord 13 produced by using joints according to the invention.

Figure 5:
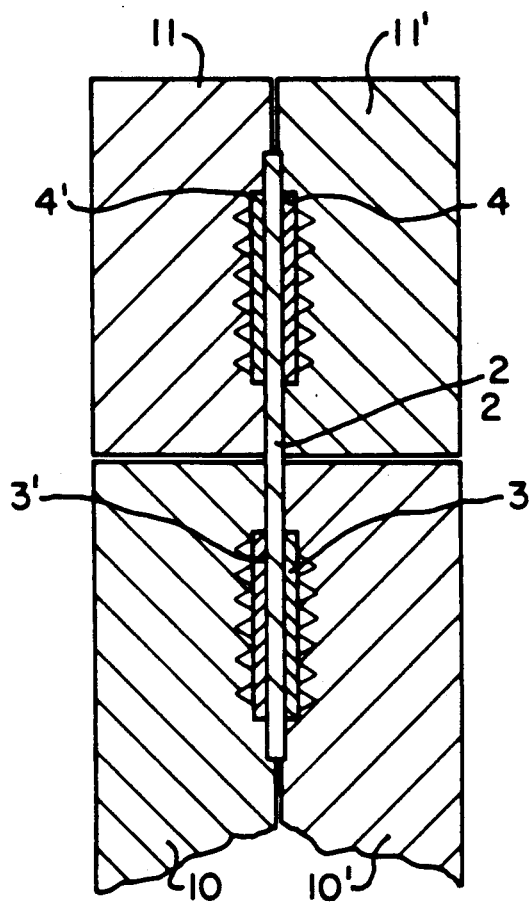
FIG. 5 depicts a cross-section of view of the connector.

FIG. 5 shows in cross-section the structure of FIG. 2, in an assembled condition sandwiching the connector between wooden portions of the two beams and pressing the resulting sandwich construction together so that teeth of one of said toothed plates on one side of said frame plate penetrate into a wooden portion of one of the beams, and teeth of another of said toothed plates on the opposite side of said frame plate penetrate into a wooden portion of the other of the beams.

I claim:

1. A connector for interconnecting beams made at least partly of wood, comprising:
    a frame plate having two opposite, toothless sides;
    at least one toothed plate having two opposite sides;
        each toothed plate having a plurality of teeth protruding outwards from a first said side thereof for penetration into at least one beam at least partially made of wood, a second said side of each said toothed plate being toothless;
    the toothless, second side of each said toothed plate being abuttingly disposed facewise against a said side of said frame plate; and a permanently fixed surface joint securing each toothed plate against the respective said side of said frame plate against which such toothed plate is abuttingly disposed facewise;

said frame plate being thicker, between said opposite sides thereof, than each said toothed plate, exclusive of said teeth of each said toothed plate;

at least one said toothed plate being secured on each side of said frame plate, whereby in use, two beams made at least partly of wood can be interconnected by the connector by sandwiching the connector between wooden portions of the two beams and pressing the resulting sandwich construction together so that teeth of one of said toothed plates on one side of said frame plate penetrate into a wooded portion of one of the beams and teeth of another of said toothed plates on the opposite side of said frame plate penetrate into a wooded portion of the other of the beams.

2. A connector according to claim 1, wherein:

said surface joint between each said toothed plate and said frame plate is a spot-welded joint.

3. A connector according to claim 2, wherein:

a plurality of said toothed plates is secured by spot-welding on said second side thereof to respective ones of each of said two opposite sides of said frame plate by spot-welding, said toothed plates each being 1-2 mm thick and planar, exclusive of said teeth provided thereon, and said frame plate being 3-8 mm thick and planar, said toothed plates on said two opposite sides being disposed in planes parallel to one another and separated by a plane containing said frame plate.

* * * * *